SIDEBAND SELECTING SYSTEM
Filed April 12, 1956
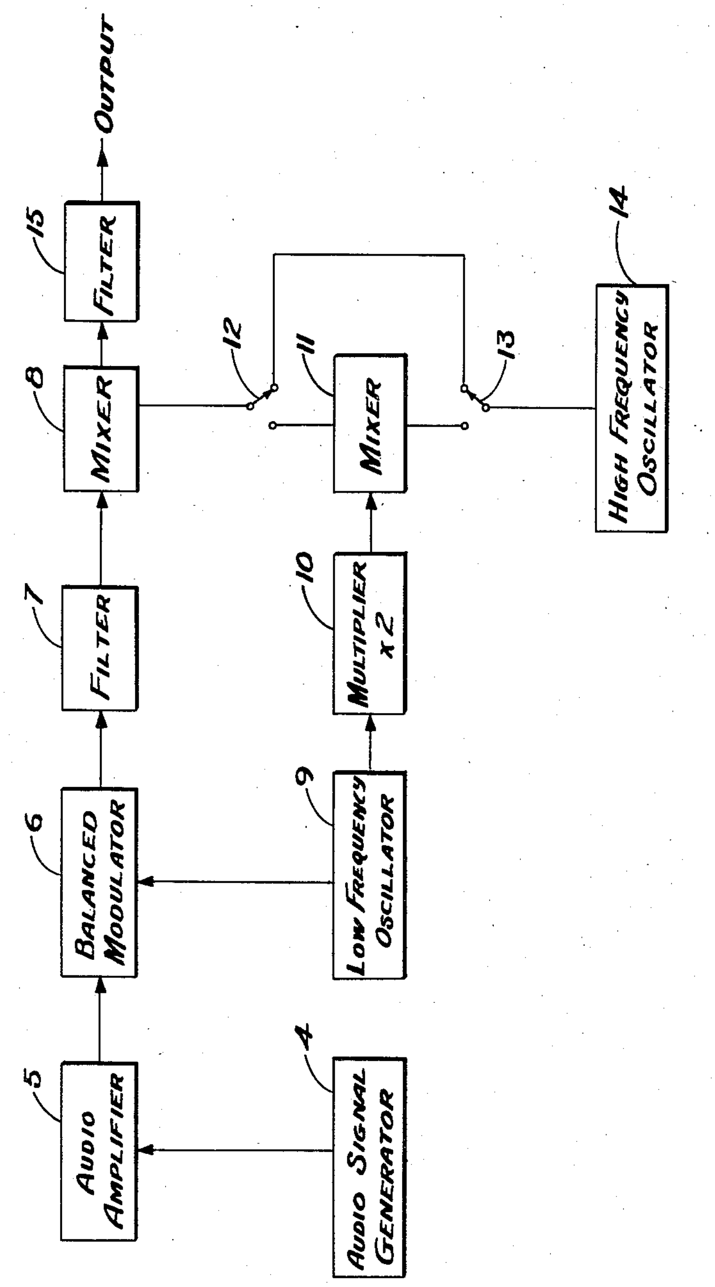
INVENTOR.
ROBERT C. MIEDKE
BY Moody and Harada
ATTORNEYS United States Patent Office 2,852,749

Patented Sept. 16, 1958

2,852,749

SIDEBAND SELECTING SYSTEM

Robert C. Miedke, Cedar Rapids, Iowa, assignor to Collins Radio Company, Cedar Rapids, Iowa, a corporation of Iowa Application April 12, 1956, Serial No. 577,783

3 Claims. (Cl. 332—45)

This invention relates to single sideband transmission systems and more particularly to a system for selecting and generating either one of two sidebands for transmission. In the normal single sideband transmission system it is the practice to use a considerable number of filters to obtain one sideband, that is, the desired sideband. These filters, if the second sideband is to be chosen or available for transmitting, either become unduly large in number or must be variable. If these filters are made variable, the frequency response characteristics of the filters may become very poor at all frequencies. If more than one filter is used, they are usually very expensive and this increases the cost of the single sideband system.

It is an object of this invention to provide a sideband selecting system for selecting either sideband for transmission which does not necessitate the use of a large number of expensive filters. It is a further object of this invention to provide a sideband selecting system which may select either sideband without varying the characteristics of the necessary filters. It is a still further object of this invention to provide a sideband selecting system for selecting either sideband for transmission which has no variable frequency components except the information source, thereby increasing the performance characteristics of the single sideband transmission system. It is another object of this invention to make available both sidebands in a single sideband transmission system by adding a switching component, a mixer, and a multiplier without the addition or alteration of any filters. It is still another object of this invention to provide a simple and economical sideband selecting system for selecting either sideband for transmission in a single sideband transmission system.

These and other objects of this invention will become apparent when the following description is read in conjunction with the accompanying drawings, in which the single figure is a block diagram of the side band selecting system of this invention. For simplicity, the blocks in the drawing are connected by single lines and it must be realized that in actual practice at least two connecting lines would be required between each of the blocks.

An operational description of this invention is presented in correlation with the description of the components. An audio amplifier 5 amplifies an audio signal from an audio source 4 and forwards this amplified signal to a balanced modulator 6. The balanced modulator 6 has fed into it also a fixed frequency signal from the low frequency oscillator 9. The output of the balanced modulator is fed to filter 7, which will pass only one frequency of the combinations of frequencies from the balanced modulator 6 to the mixer 8. If it is desired to transmit the upper sideband, then the switches 12 and 13 will be in the position shown in the drawing. In this instance, the high frequency signal from the high frequency oscillator 14 is fed directly through switches 12 and 13 to mixer 8. The output of mixer 8 is fed to a bandpass filter 15 which will pass the upper and lower sidebands of the single sideband system. However, there will be at any one instant either the upper or the lower sideband only fed to the filter 15.

In a specific example, if the audio signal is 1.5 kilocycles and the low frequency oscillator generates a signal of 248.2 kilocycles, the balanced modulator in combination with the filter 7 produces an output signal of 249.7 kilocycles. In this specific example, filter 7 has a center frequency of 250 kilocycles and a bandpass of 3 kilocycles. The output of filter 7 is fed to mixer 8. In mixer 8, the 249.7 kilocycles are combined with the high frequency oscillator signal which may be assumed to be 3 megacycles. The output from the mixer 8 is then either 3249.7 kilocycles or 2750.3 kilocycles. The filter 15 is set with a center frequency of 3248.2 kilocycles and therefore only the upper sideband will be fed to the output with the 2750.3 kilocycle signal being filtered out. Now if it is desired to transmit the lower sideband, switches 12 and 13 will be placed in the opposite position from that shown in the drawing. Now the audio amplifier and balanced modulator in combination with the filter 7 will feed the same frequency as before into mixer 8. However, the changing of switches 12 and 13 to the opposite position now inserts the multiplier 10 and the mixer 11 into the single sideband generating system. The multiplier 10 doubles the frequency of the oscillator 9 and feeds the resulting frequency into mixer 11. Mixer 11 now has input frequencies of 496.4 kilocycles and the 3 megacycle signal from the high frequency oscillator 14. The mixer then has two output frequencies, either 3496.4 kilocycles or 2503.6 kilocycles. Both of these frequencies are fed into the mixer 8. In mixer 8, these signals are combined with the 249.7 kilocycle signal from the audio source and filter 7. The output signals from the mixer 8 into filter 15 are then 3246.7 kilocycles and other frequencies such as 2753.3 kilocycles which will obviously be rejected by the filter 15.

By the addition of the switching elements 12 and 13, a multiplier, and a mixer, a single sideband system has been converted to generate both sidebands. Either sideband may be selected and generated as required with no extra filters and no change in the value of filters. There is also no change in the frequency of the oscillators necessary for the generation of the sidebands and, as a result, crystal oscillators of very high accuracy may be used. The resulting single sideband signal is very accurate in bandwidth and is a much better signal than that generated by systems which change the values of filters or oscillators.

Although this invention has been described with respect to a particular embodiment thereof, it is not to be so limited, as changes and modifications may be made therein which are within the full intended scope of the invention, as defined by the appended claims.

What is claimed is:

1. A single sideband frequency generating system comprising a source of audio frequency signals, a source of low frequency signals, a first mixing means, said first mixing means connected to said source of audio frequency signals, and said low frequency signals for combining said signals, a first filter means having one side connectel to said first mixer, and passing only one of the frequency combinations produced in said first mixer, a second mixer connected to the other side of said first filter, a source of high frequency signals, a selection means, said selection means connecting said high frequency signals to said second mixer in a first position whereby the output frequency from said second mixer is selectively produced as one sideband, a frequency multiplier connected to said low frequency signal source, a third mixer connected to said frequency multiplier and said selection means, said selection means in a second position placing said third mixer between said high frequency oscillator and said second mixer whereby the output frequency from said second mixer is selectively produced as the other sideband.

2. A single sideband frequency generating system comprising a plurality of sources of oscillation, at least one source generating an audio frequency signal, a second source generating a low frequency signal, and a third source generating a high frequency signal, a plurality of mixing means, a first one of said mixing means combining said audio frequency signal with said low frequency signal, a first one of said filters passing a fixed combined frequency from said first mixing means, a second mixing means receiving the output of the first filter, a frequency multiplier connected to the second source, a third mixing means receiving the output of the frequency multiplier, a pair of switches, the movable contact of the first of said pair of switches connected to the high frequency oscil- movable to engage a first contact connected to the output of the high frequency oscillator to said third mixer, the movable contact of the second switch connected to the second mixer and movable to a first contact connected to the output of the third mixer, the other contacts of the first and second switches connected together, and a second filter receiving the output of the second mixer.

3. A single sideband frequency generating system comprising a source of audio frequency signals, a source of low frequency signals, a first mixing means receiving the outputs of the source of audio frequency signals and the source of low frequency signals, a first filter receiving an input from the first mixing means and passing only one of the frequency combinations produced in the first mixing means, a second mixer receiving the output of the first filter, a frequency multiplier receiving an output from the source of low frequency signals, a third mixer receiving the output of the frequency multiplier, a first switch with a movable contact connected to the second mixer and movable to engage a first contact connected to the output of the third mixer and a second contact not connected to the third mixer, a high frequency oscillator, a second switch with its movable contact connected to the output of the high frequency oscillator and movable to engage a first contact connected to the third mixer and a second contact not connected to the third mixer, a lead connecting the second contacts of the first and second switches, and a second filter connected to the output of the second mixer.

References Cited in the file of this patent

UNITED STATES PATENTS 2,272,068 Pollack ---------------- Feb. 3, 1942

UNITED STATES PATENT OFFICE
CERTIFICATE OF CORRECTION

Patent No. 2,852,749 September 16, 1958

Robert C. Miedke

It is hereby certified that error appears in the printed specification of the above numbered patent requiring correction and that the said Letters Patent should read as corrected below.

Column 3, line 16, for "oscil-" read -- oscillator and --; line 17, strike out "engage"; same line 17, for "connected" read -- to connect --.

Signed and sealed this 3rd day of February 1959.

(SEAL)

Attest:

KARL H. AXLINE

Attesting Officer

ROBERT C. WATSON

Commissioner of Patents